United States Patent
Kitamura (10) Patent No.: US 11,574,490 B2
(45) Date of Patent: Feb. 7, 2023

(54) INFORMATION PROCESSING APPARATUS AND NON-TRANSITORY COMPUTER READABLE MEDIUM STORING INFORMATION PROCESSING PROGRAM

(71) Applicant: FUJIFILM BUSINESS INNOVATION CORP., Tokyo (JP)

(72) Inventor: Takumi Kitamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 315 days.

(21) Appl. No.: 16/822,464

(22) Filed: Mar. 18, 2020

(65) Prior Publication Data

US 2021/0056301 A1 Feb. 25, 2021

(30) Foreign Application Priority Data

Aug. 21, 2019 (JP) ............................. JP2019-151505

(51) Int. Cl.
*G06K 9/00* (2022.01)
*G06V 30/412* (2022.01)
*G06F 3/0482* (2013.01)
*G06V 10/40* (2022.01)
*G06V 30/10* (2022.01)

(52) U.S. Cl.
CPC .......... *G06V 30/412* (2022.01); *G06F 3/0482* (2013.01); *G06V 10/40* (2022.01); *G06V 30/10* (2022.01)

(58) Field of Classification Search
CPC ................ G06F 3/04812; G06F 3/017; G06F 17/30598; G06F 3/1243; G06F 3/1208; G06F 17/24; G06F 3/0481; H04L 67/06; G06K 9/00449; H04N 1/00204; H04N 1/00344
USPC ........................................... 382/229; 715/748
See application file for complete search history.

(56) References Cited

U.S. PATENT DOCUMENTS

2014/0325382 A1* 10/2014 Brown .................. G06F 3/0488 715/748
2018/0011921 A1* 1/2018 Barclay ................. G06F 16/284

FOREIGN PATENT DOCUMENTS

JP 2016-051339 A 4/2016

* cited by examiner

*Primary Examiner* — Phuoc H Doan
(74) *Attorney, Agent, or Firm* — Oliff PLC (57) ABSTRACT

An information processing apparatus includes a processor configured to detect, in response to detection of plural first character strings each representing a first item from a document having writing fields for items, second character strings related to the plural first character strings, respectively, and set at least one of the detected second character strings in setting information as a second item associated with the first item.

20 Claims, 9 Drawing Sheets

POWER OF ATTORNEY

ATTORNEY IN FACT — 31  ADDRESS: — 32
                      NAME: — 32
                      BIRTHDAY: — 32

I HEREBY APPOINT THE ABOVE PERSON AS MY ATTORNEY
IN FACT TO PERFORM THE FOLLOWING ACTS ON MY BEHALF.

DELEGATION OF POWER (                              )

DATE:

PRINCIPAL     ADDRESS:

NAME:              (SIGNATURE)

BIRTHDAY:

FIG. 4

| GROUP KEY | KEY |
|---|---|
| GUARANTOR | FULL NAME |
| | ADDRESS |
| | PHONE NUMBER |
| | NAME |
| | PHONE |
| | RESIDENCE |
| GUARANTEE | FULL NAME |
| | ADDRESS |
| | PHONE NUMBER |
| | NAME |
| | PHONE |
| | RESIDENCE |
| BANK | NAME OF BANK |
| | BRANCH |
| | ACCOUNT NUMBER |
| | ⋮ |
| ⋮ | ⋮ |

```
LETTER OF GUARANTEE

RESIDENCE:

FULL NAME:              (SIGNATURE)

BIRTHDAY:

I CERTIFY THE ABOVE PERSON'S IDENTITY.
                     33
 GUARANTOR
                         32
     RESIDENCE:  32
    OCCUPATION:  32                                32
                                    RELATIONSHIP:
      FULL NAME:                     (SIGNATURE)
                     34
 GUARANTOR
                         32
     RESIDENCE:  32
    OCCUPATION:  32                                32
                                    RELATIONSHIP:
      FULL NAME:                     (SIGNATURE)
```

POWER OF ATTORNEY

32

:ATTORNEY IN FACT: ADDRESS:

:NAME: 31

BIRTHDAY:

I HEREBY APPOINT THE ABOVE PERSON AS MY ATTORNEY IN FACT TO PERFORM THE FOLLOWING ACTS ON MY BEHALF.

DELEGATION OF POWER (                    )

DATE:

32

:PRINCIPAL:    ADDRESS:

:NAME: 31                    (SIGNATURE)

BIRTHDAY:

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2019-151505 filed Aug. 21, 2019.

BACKGROUND

(i) Technical Field

The present disclosure relates to an information processing apparatus and a non-transitory computer readable medium storing an information processing program.

(ii) Related Art

Japanese Unexamined Patent Application Publication No. 2016-051339 discloses a document recognition apparatus that recognizes character strings written in a document. The document recognition apparatus includes an image inputter, an item-value indication score calculator, an item-value word score calculator, an item-value candidate selector, an item-value candidate position score calculator, an item-value candidate pair score calculator, an item-value group evaluator, and an outputter. The image inputter inputs a document image containing item names and item values. The item name is a character string representing an attribute of data. The item value is a character string representing the data associated with the item name. The item-value indication score calculator calculates an item-value indication score, which is a probability that a character string recognized in the document image is the item value. The item-value word score calculator calculates an item-value word score, which is a probability that a character string in the document image is an item-value word representing a specific item value registered in advance. The item-value candidate selector defines an item value score (Sv), which includes both the item-value indication score and the item-value word score. If the item value score of a character string is higher than a predetermined threshold, the item-value candidate selector selects the character string as an item-value candidate, and gives the item value score (Sv) as an item-value candidate score (Sc) of the selected item-value candidate. The item-value candidate position score calculator defines an item-value group, which is a combination of item values having a plurality of attributes related to each other in the document image. The item-value candidate position score calculator calculates an item-value candidate position score (Sca) indicating whether the positional relationship between a pair of character strings serving as item-value candidates in the document image is appropriate as the positional relationship between the item values in the item-value group. Based on the item value scores (Sv) and the item-value candidate position score (Sca) of the pair of character strings serving as item-value candidates in the document image, the item-value candidate pair score calculator calculates an item-value candidate pair score (Scp), which is an evaluation value indicating the likelihood of the pair of character strings being the item values in the item-value group. The item-value group evaluator recognizes the character strings of the item values by evaluating association between the character strings in the document image and the item-value group based on the item-value candidate pair score (Scp). The outputter outputs a result of the recognition of the character strings in the document image.

SUMMARY

Aspects of non-limiting embodiments of the present disclosure relate to the following circumstances. For example, there is an information processing apparatus that reads a document filled out by a user to detect a set item from the document, recognizes a character string associated with the detected item from the document, and outputs the recognized character string.

For example, a written document may contain a plurality of identical items such as "Name". In this case, a plurality of character strings may be recognized in association with one item set in setting information. When the document containing the plurality of identical items is read, the plurality of recognized character strings associated with the item set in the setting information are not distinguished from each other. In this case, a user manually edits data so that the plurality of recognized character strings associated with the item may be distinguished from each other. Therefore, the amount of user's work is not reduced.

It is desirable to provide an information processing apparatus and a non-transitory computer readable medium storing an information processing program, in which the amount of user's work for recognition results may be reduced compared with a case where a document containing a plurality of identical items is read and a plurality of recognized character strings associated with a set item are not distinguished from each other.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus comprising a processor configured to detect, in response to detection of a plurality of first character strings each representing a first item from a document having writing fields for items, second character strings related to the plurality of first character strings, respectively, and set at least one of the detected second character strings in setting information as a second item associated with the first item.

BRIEF DESCRIPTION OF THE DRAWINGS

Exemplary embodiments of the present disclosure will be described in detail based on the following figures, wherein.

DETAILED DESCRIPTION

First Exemplary Embodiment

Technologies according to exemplary embodiments of the present disclosure are described below in detail with reference to the drawings. For example, an information processing apparatus 1 according to a first exemplary embodiment is a server that manages data obtained by reading documents, forms, and the like. For example, the information processing apparatus 1 may be mounted on a multifunction peripheral having a printing function, a copying function, a scanning function, and a facsimile function, or may be a personal computer or other terminals.

Figure 1:
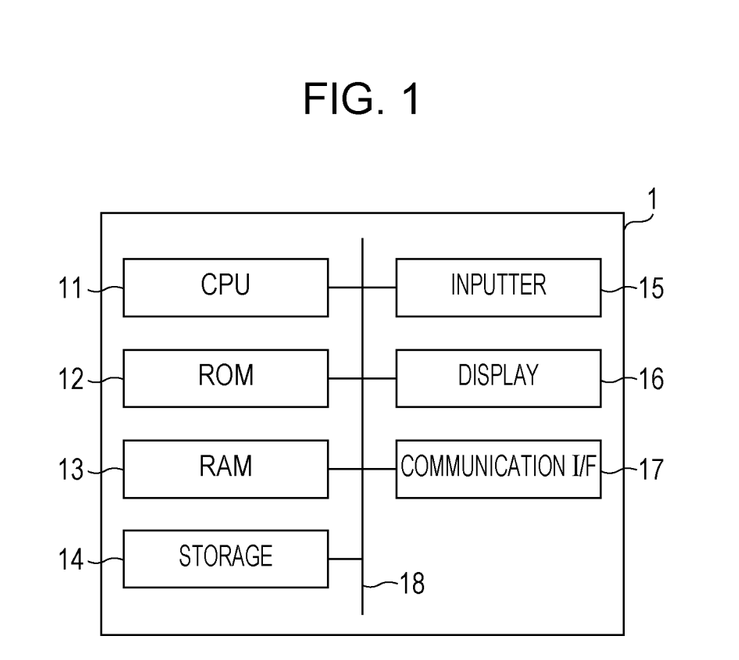
FIG. 1 is a block diagram illustrating an example of the hardware configuration of an information processing apparatus according to each exemplary embodiment.

FIG. 1 is a block diagram illustrating an example of the hardware configuration of the information processing apparatus 1 according to this exemplary embodiment. As illustrated in FIG. 1, the information processing apparatus 1 according to this exemplary embodiment includes a central processing unit (CPU) 11, a read only memory (ROM) 12, a random access memory (RAM) 13, a storage 14, an inputter 15, a display 16, and a communication interface (communication I/F) 17. The CPU 11, the ROM 12, the RAM 13, the storage 14, the inputter 15, the display 16, and the communication I/F 17 are connected to each other via a bus 18. The CPU 11 according to this exemplary embodiment is an example of a processor.

The CPU 11 controls the entire information processing apparatus 1. The ROM 12 stores data and various programs including an information processing program for use in this exemplary embodiment. The RAM 13 is a memory to be used as a working area during execution of various programs. The CPU 11 loads, on the RAM 13, a program stored in the ROM 12 and executes the program, thereby detecting character strings and storing the detected character strings in association. Examples of the storage 14 include a hard disk drive (HDD), a solid state drive (SSD), and a flash memory. The storage 14 may store the information processing program or the like. Examples of the inputter 15 include a keyboard and a mouse that receive operations of inputting character strings to be detected and selecting character strings. Examples of the display 16 include a monitor that displays detected character strings as candidates for setting. The communication I/F 17 transmits and receives data.

Figure 2:
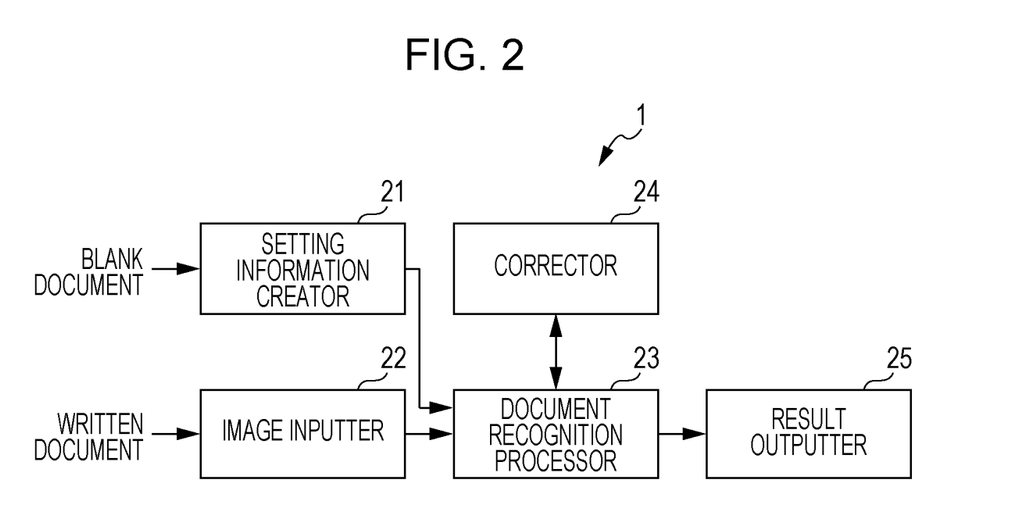
FIG. 2 is a block diagram illustrating an example of the functional configuration of the information processing apparatus according to each exemplary embodiment.

Next, the functional configuration of the information processing apparatus 1 is described. FIG. 2 is a block diagram illustrating an example of the functional configuration of the information processing apparatus 1 according to this exemplary embodiment.

As illustrated in FIG. 2, the information processing apparatus 1 includes a setting information creator 21, an image inputter 22, a document recognition processor 23, a corrector 24, and a result outputter 25. The CPU 11 executes the information processing program to function as the setting information creator 21, the image inputter 22, the document recognition processor 23, the corrector 24, and the result outputter 25.

The setting information creator 21 receives operations of inputting blank document data and a detection target item (hereinafter referred to as "first item") contained in the document, and detects a character string (hereinafter referred to as "first character string") representing the first item from the document having writing fields for items. If a plurality of first character strings are detected, the setting information creator 21 detects other character strings (hereinafter referred to as "second character strings") related to the plurality of first character strings, respectively. The setting information creator 21 sets at least one of the detected second character strings in setting information as an item (hereinafter referred to as "second item") associated with the first item.

That is, the setting information creator 21 detects the input first item from the blank document data, detects the second item associated with the first item, and sets the first item and the second item in the setting information. The setting information creator 21 associates the first item with the second item based on positional information of the first item and the second item in the document or a hierarchical relationship of word definitions of the first item and the second item. Then, the setting information creator 21 sets the first item and the second item in the setting information. The setting information contains information on a relative position of a character string (hereinafter referred to as "third character string") to be handwritten by a user. The relative position is a position where the third character string is written relative to the first item and the second item.

The setting information creator 21 executes a process of displaying the plurality of detected first character strings as candidates for the first item, or a process of displaying the plurality of second character strings as candidates for the second item. The setting information creator 21 executes a process of prompting the user to select at least one of the plurality of detected first character strings as the first item, or a process of prompting the user to select at least one of the plurality of second character strings as the second item. When setting a plurality of identical first items or a plurality of identical second items in the setting information, the setting information creator 21 assigns unique characters to the first items or the second items, respectively.

The setting information creator 21 according to this exemplary embodiment creates the setting information by receiving an operation of inputting blank document data. The setting information creator 21 may create the setting information by reading character strings from a written document.

The image inputter 22 executes a process of reading a document filled out by the user to obtain an image. The document recognition processor 23 recognizes a third character string from the image by optical character recognition (OCR) based on the setting information. The corrector 24 displays the recognized third character string on the display 16 and receives an operation of correcting the third character string.

The result outputter 25 outputs the recognized third character string in association with each item. The result outputter 25 outputs the recognized third character string in a format in which the first item contained in the setting information, the second item contained in the setting information, and the third character string are output separately (hereinafter referred to as "JSON format"). Alternatively, the result outputter 25 outputs the recognized third character string in a format in which the first item and the second item contained in the setting information are linked into a unified item and the unified item and the third character string are output (hereinafter referred to as "key-value format"). The result outputter 25 outputs the first item, the second item, and the third character string in the JSON format or the key-value format. The setting information creator 21 receives an operation of selecting the output format and sets the selected output format in the setting information. The JSON format is an example of a first format. However, the first format is not limited to the JSON format. The key-value format is an example of a second format. However, the second format is not limited to the key-value format.

In this exemplary embodiment, the setting information creating function involving the setting information creator 21 and the OCR function involving the image inputter 22, the document recognition processor 23, the corrector 24, and the result outputter 25 are provided in a single apparatus. The setting information creating function and the OCR function may be provided in different apparatuses if the setting information is read at the time of executing OCR.

Next, a method for creating the setting information by the information processing apparatus 1 is described with reference to FIG. 3 to FIG. 6B prior to description of operations of the information processing apparatus 1. A document according to this exemplary embodiment contains items such as "Name" and "Address" (hereinafter referred to as "keys"), and items such as "Principal" and "Attorney in fact", which are superordinate items inclusive of a plurality of keys (hereinafter referred to as "group keys"). In the first exemplary embodiment, the first item is the group key, and the second item is the key.

Figure 3:
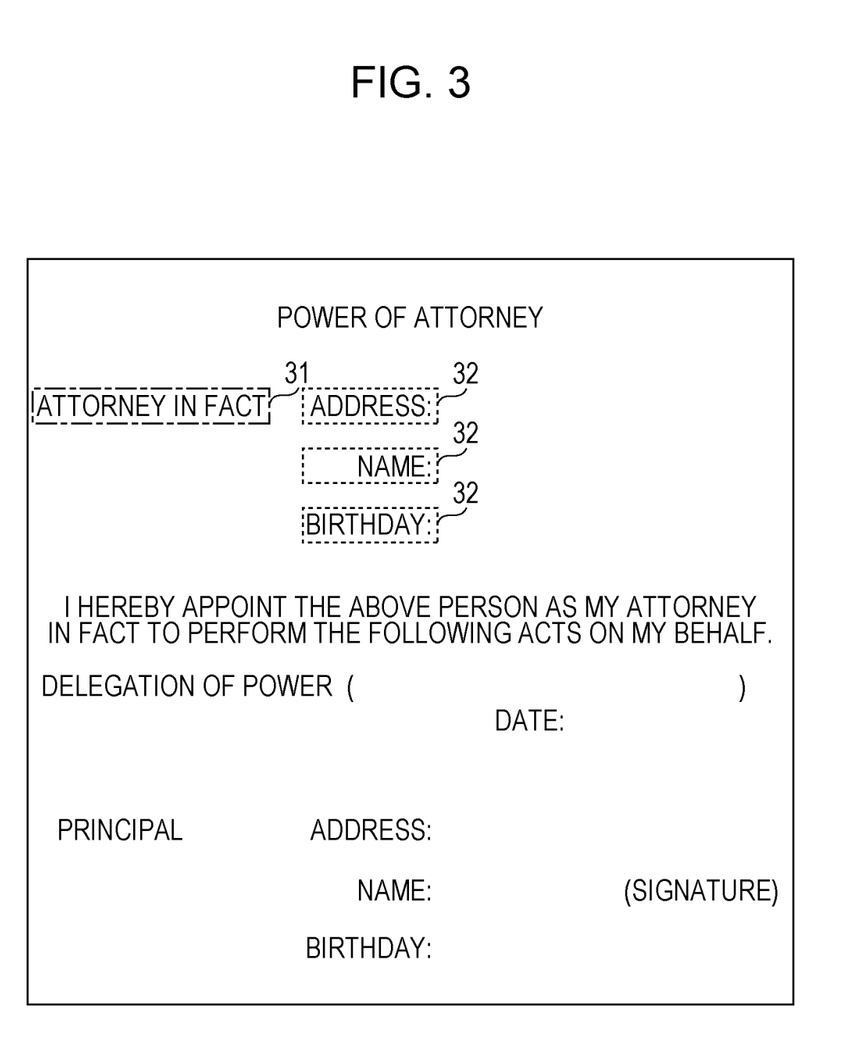
FIG. 3 illustrates an example of a blank document according to a first exemplary embodiment.

First, a method for creating setting information by inputting a group key is described with reference to FIG. 3. FIG. 3 illustrates an example of a blank document according to this exemplary embodiment.

For example, a power of attorney is input to the information processing apparatus 1 as blank document data as illustrated in FIG. 3. The power of attorney contains items for "Address", "Name", and "Birthday" of "Attorney in fact". The power of attorney also contains items for "Address", "Name", and "Birthday" of "Principal".

For example, document data of the power of attorney and a group key "Attorney in fact" serving as a detection target are input to the information processing apparatus 1. As illustrated in FIG. 3, the information processing apparatus 1 detects a first character string 31 enclosed by a chain line as a candidate for a first item, displays the first character string 31 on the display 16, and sets the first character string 31 as the first item. Specifically, the information processing apparatus 1 detects "Attorney in fact" from the input document data and highlights "Attorney in fact" on the display 16. If one first character string 31 is detected, the first character string 31 is set in the setting information as the first item. If a plurality of first character strings 31 are detected, the plurality of first character strings 31 are displayed on the display 16 and a first character string 31 selected by the user is set in the setting information as the first item. The user may select one or more first character strings.

In response to the setting of the first item, the information processing apparatus 1 detects second character strings 32 enclosed by dotted lines as candidates for a second item to be associated with the first item, displays the second character strings 32 on the display 16, and sets the second character strings 32 as the second items. Specifically, the information processing apparatus 1 detects "Address", "Name", and "Birthday" around "Attorney in fact" and highlights "Address", "Name", and "Birthday" on the display 16. If one second character string 32 is detected, the second character string 32 is set in the setting information as the second item. If a plurality of second character strings 32 are detected, the plurality of second character strings 32 are displayed on the display 16 and a second character string 32 selected by the user is set in the setting information as the second item. The user may select one or more second character strings.

In response to the setting of the second items, the information processing apparatus 1 prompts the user to select expected positions of third character strings relative to the positions of the second items (keys), and sets the selected relative positions in the setting information. The information processing apparatus 1 prompts the user to select an output format to be used when the third character strings are recognized, and sets the selected output format in the setting information.

When a written document is read, the information processing apparatus 1 acquires the setting information of the document identical to the read document, and recognizes, from the document, the third character strings associated with the first item and the second items contained in the setting information. The information processing apparatus 1 outputs the first item, the second items, and the third character strings in the output format set in the setting information.

In this exemplary embodiment, the second character strings around the first item are set as the second items. Directions in which the second character strings 32 are detected may be specified based on the first item. Specifically, the information processing apparatus 1 may detect the second character strings 32 based on positions (directions) relative to the first item. Alternatively, the information processing apparatus 1 may associate the first item with the second items based on hierarchical relationships of word definitions of the first item and the second items.

Figure 4:
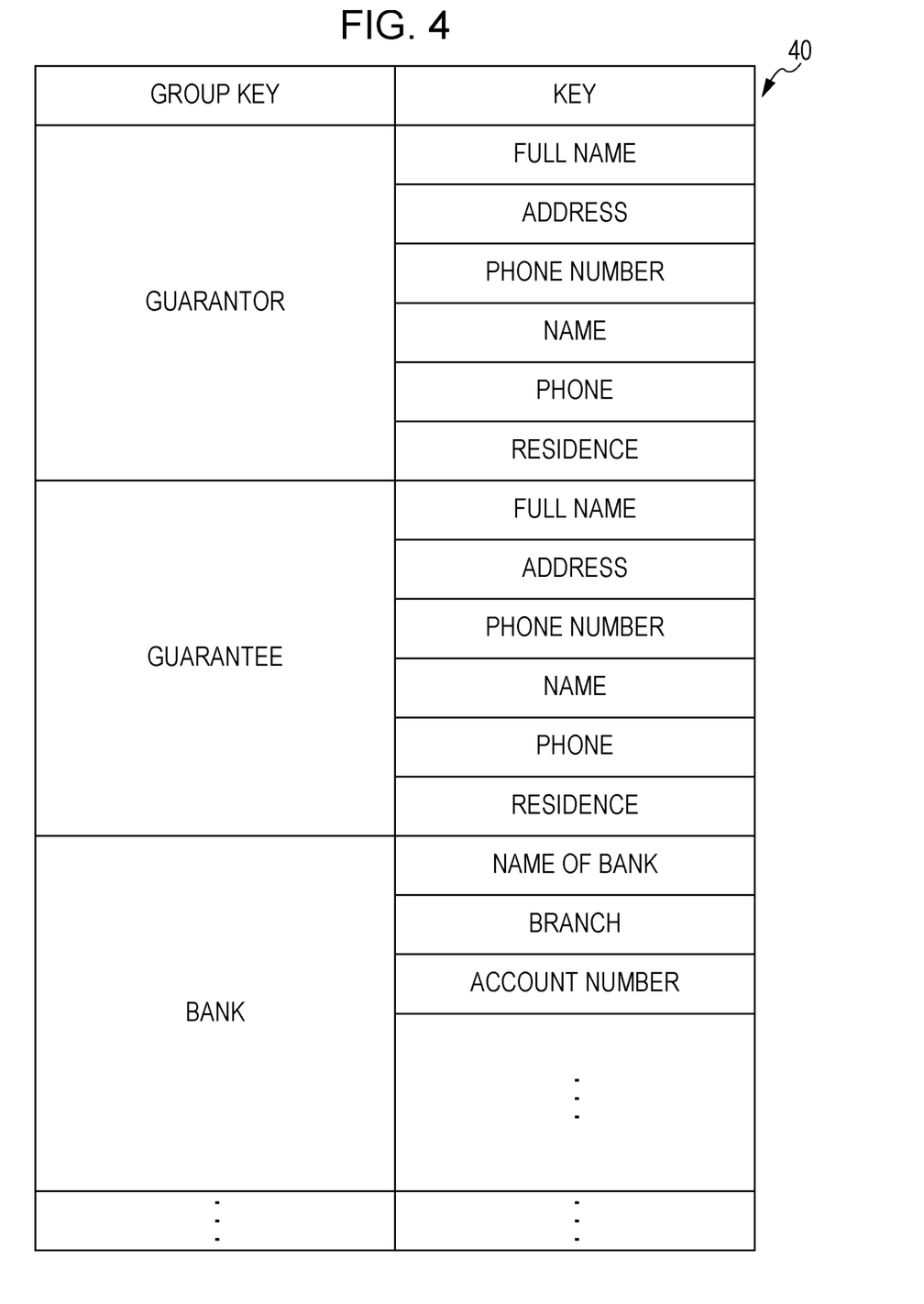
FIG. 4 is a schematic diagram illustrating an example of an item-relation database according to each exemplary embodiment.

Next, association of a first item and a second item based on a hierarchical relationship of word definitions is described with reference to FIG. 4. FIG. 4 is a schematic diagram illustrating an example of an item-relation database (hereinafter referred to as "item-relation DB") 40 according to this exemplary embodiment.

As illustrated in FIG. 4, the item-relation DB 40 stores, for example, group keys and keys as information indicating hierarchical relationships of word definitions of first items and second items. The group key stored in the item-relation DB 40 is a superordinate item inclusive of a plurality of keys. The key stored in the item-relation DB 40 is a candidate item belong to and having a relationship with the group key. That is, the item-relation DB 40 defines and prestores group keys and keys having hierarchical relationships. For example, the item-relation DB 40 stores a group key "Guarantor" in association with candidate keys "Full name", "Address", "Phone number", "Name", "Phone", and "Residence" belonging to the group key "Guarantor". The information processing apparatus 1 detects second character strings 32 by comparing items contained in a document and information acquired from the item-relation DB.

Specifically, when detecting second character strings 32 based on hierarchical relationships of word definitions, the information processing apparatus 1 searches the item-relation DB 40 to acquire keys associated with a group key set as a first item. The information processing apparatus 1 compares items contained in a document and the acquired keys. When the information processing apparatus 1 finds matches, the information processing apparatus 1 highlights the matched items as the second character strings 32.

In this exemplary embodiment, the item-relation DB 40 prestores the information indicating the hierarchical relationships of word definitions. The item-relation DB 40 may accumulate the information indicating the hierarchical relationships of word definitions by storing first items and second items when they are set in the setting information.

Figure 5:
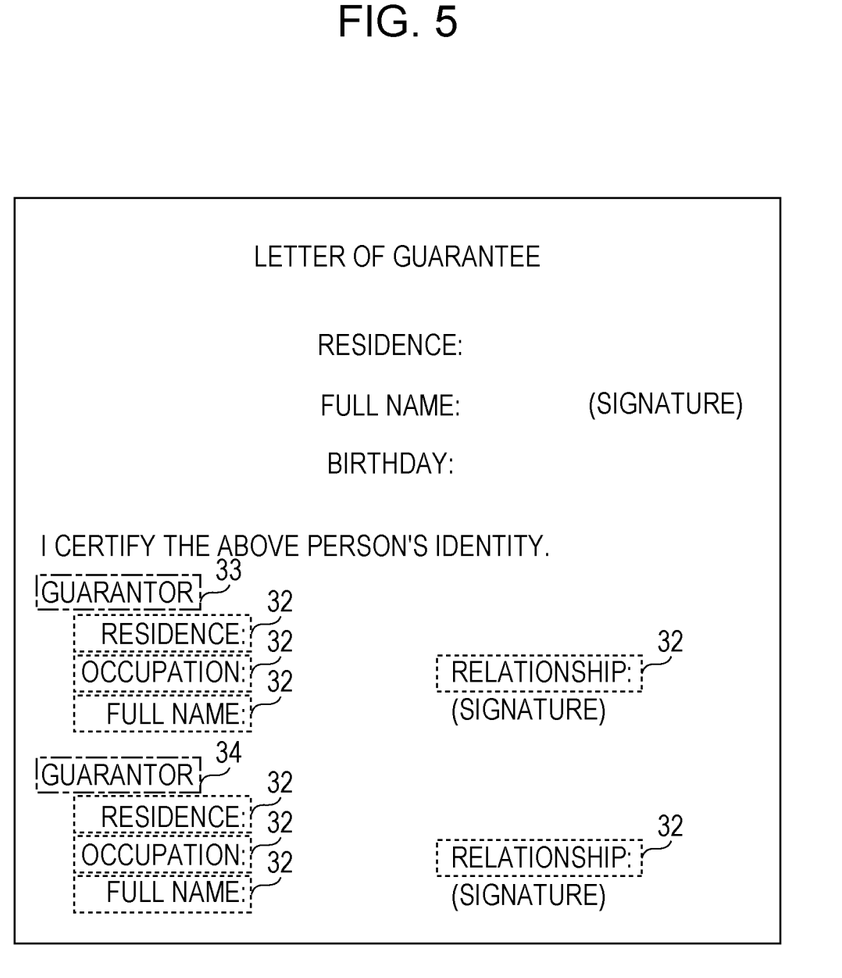
FIG. 5 illustrates an example of a blank document in which identical group keys are set according to each exemplary embodiment.

Referring to FIG. 5, description is made of a case where identical group keys are set in the setting information. FIG. 5 illustrates an example of a blank document in which identical group keys are set according to this exemplary embodiment.

For example, a letter of guarantee is input to the information processing apparatus 1 as blank document data as illustrated in FIG. 5. The letter of guarantee contains items for "Residence", "Occupation", "Full name", and "Relationship" of "Guarantor".

Document data of the letter of guarantee and a group key "Guarantor" serving as a detection target are input to the information processing apparatus 1. As illustrated in FIG. 5, the information processing apparatus 1 detects a first character string 33 and a first character string 34 enclosed by chain lines as candidates for a first item, and displays the first character string 33 and the first character string 34 on the display 16. In response to the user selecting the first character string 33 and the first character string 34, the information processing apparatus 1 sets the first character string 33 and the first character string 34 as the first items. The information processing apparatus 1 detects second character strings 32 as candidates for second items to be associated with the first character string 33 and the first character string 34, and displays the second character strings 32 on the display 16. In response to the user selecting any second character strings 32, the information processing apparatus 1 sets the selected second character strings 32 in the setting information as the second items.

If a plurality of group keys are selected as first items or second items and the selected group keys are identical to each other, the information processing apparatus 1 assigns unique characters to the group keys so that the group keys are uniquely determined, and sets the group keys in the setting information. Specifically, the document data of the letter of guarantee illustrated in FIG. 5 contains a plurality of group keys "Guarantor" detected as the first character string 33 and the first character string 34. In response to the user selecting the first character string 33 and the first character string 34, the information processing apparatus 1 assigns "1" to the group key "Guarantor" corresponding to the first character string 33 and "2" to the group key "Guarantor" corresponding to the first character string 34, and sets the group keys in the setting information. That is, when OCR is executed based on this setting information, "Residence", "Occupation", "Full name", and "Relationship" of "Guarantor 1" and "Residence", "Occupation", "Full name", and "Relationship" of "Guarantor 2" are output. In this exemplary embodiment, the unique characters are assigned when the group keys are identical to each other, but may be assigned when the keys are identical to each other. In this exemplary embodiment, the unique character is a number, but may be a symbol or a combination of a number and a symbol.

Figure 6A:
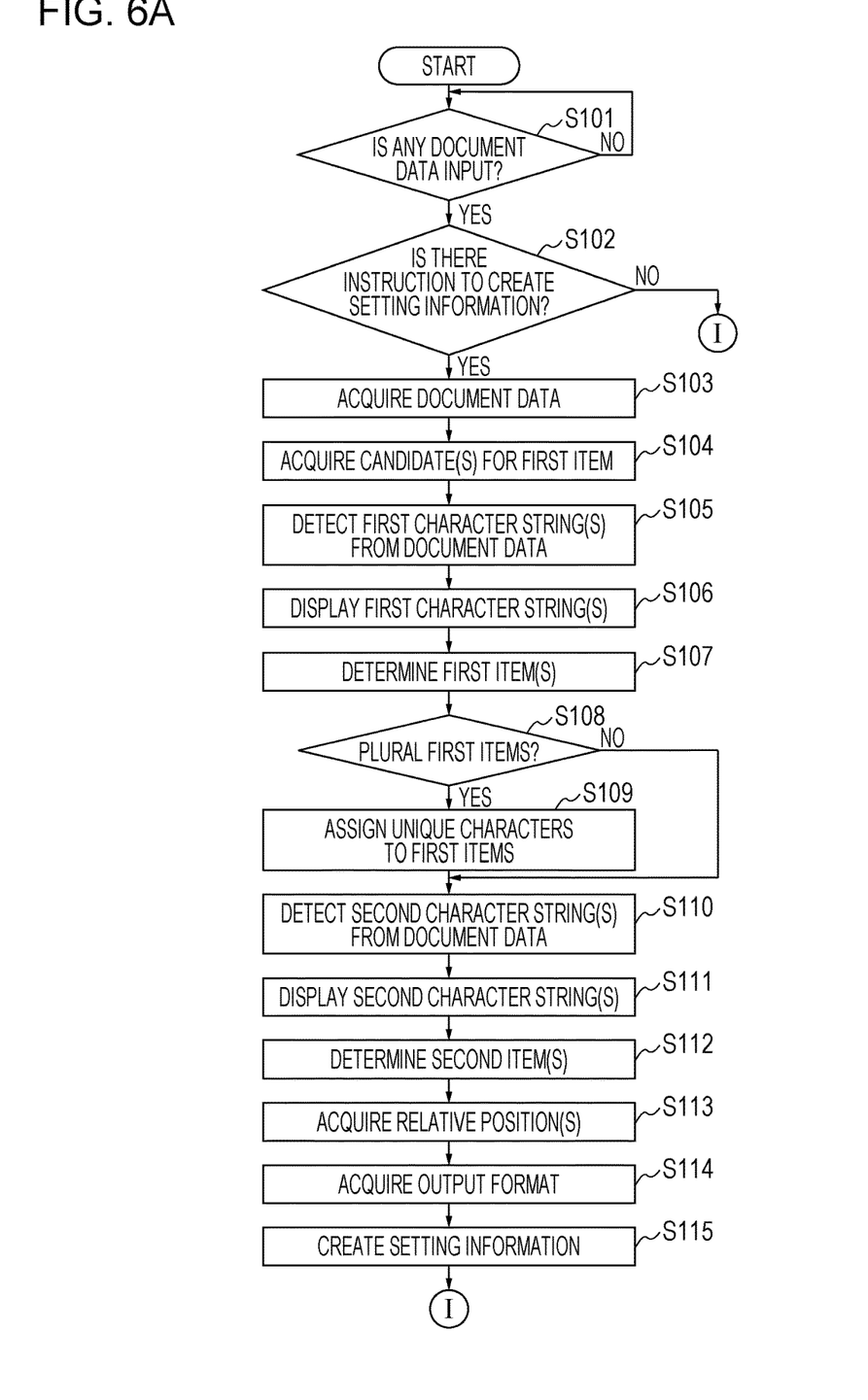
FIGS. 6A and 6B are flowcharts illustrating an example of an information process according to the first exemplary embodiment.
Figure 6B:
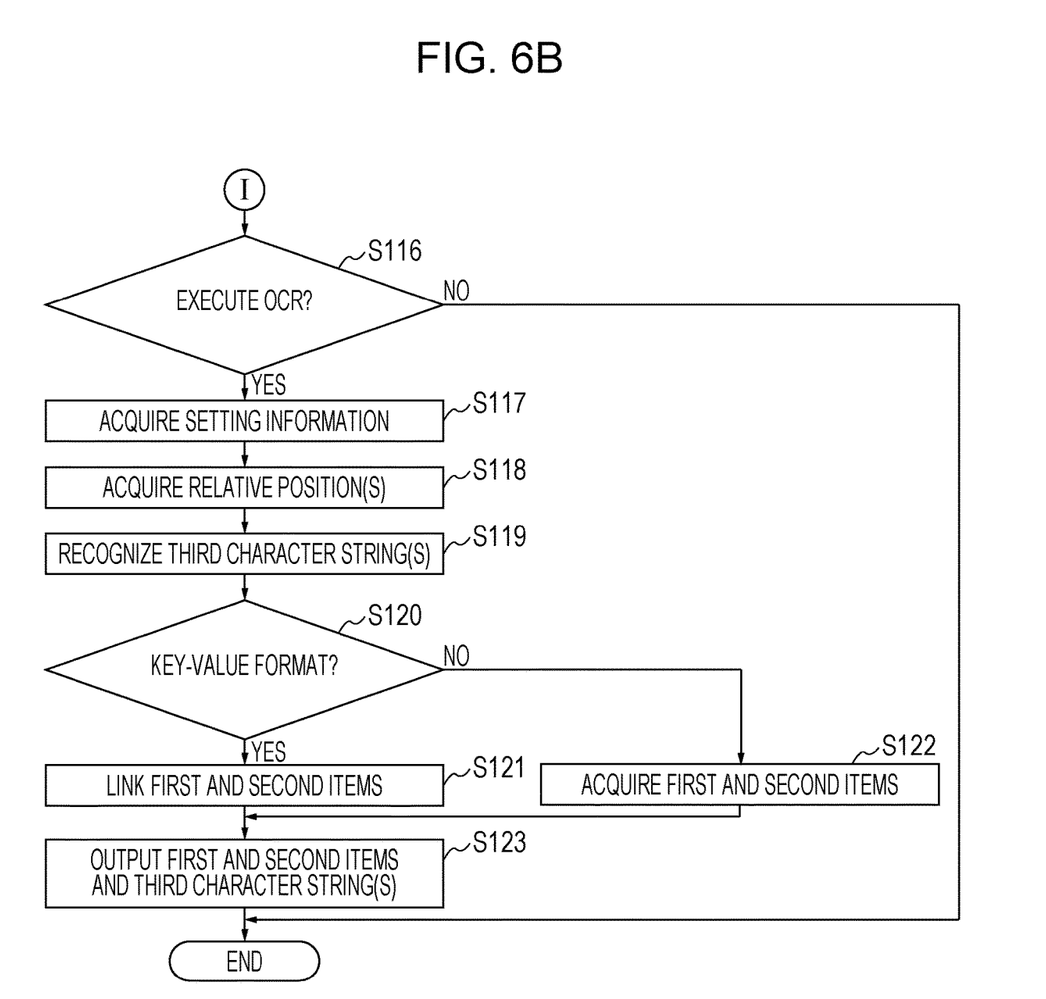

Next, operations of the information processing program according to this exemplary embodiment are described with reference to FIGS. 6A and 6B. FIGS. 6A and 6B are flowcharts illustrating an example of an information process according to this exemplary embodiment. The CPU 11 executes the information process illustrated in FIGS. 6A and 6B by executing the information processing program read from the ROM 12 or the storage 14. For example, the information process illustrated in FIGS. 6A and 6B is executed when document data is input and an instruction to execute the information processing program is input.

In Step S101, the CPU 11 determines whether any document data is input. If document data is input (Step S101: YES), the CPU 11 proceeds to Step S102. If no document data is input (Step S101: NO), the CPU 11 waits for input of document data. Along with the input of document data, the user inputs an instruction to create setting information or an instruction to execute OCR, and the JSON format or the key-value format.

In Step S102, the CPU 11 determines which of the instruction to create setting information and the instruction to execute OCR is input by the user. If the instruction to create setting information is input (Step S102: YES), the CPU 11 proceeds to Step S103. If the instruction to execute OCR is input (Step S102: NO), the CPU 11 proceeds to Step S116.

In Step S103, the CPU 11 acquires the input document data.

In Step S104, the CPU 11 acquires an input candidate for a first item.

In Step S105, the CPU 11 detects a first character string (or first character strings) contained in the document data by using the input candidate for the first item.

In Step S106, the CPU 11 highlights the detected first character string(s). The user selects the first character string(s).

In Step S107, the CPU 11 sets the selected first character string(s) as the first item(s).

In Step S108, the CPU 11 determines whether a plurality of first items are set. If a plurality of first items are set (Step S108: YES), the CPU 11 proceeds to Step S109. If a plurality of first items are not set (Step S108: NO), the CPU 11 proceeds to Step S110.

In Step S109, the CPU 11 assigns unique characters to the plurality of set first items and stores the first items.

In Step S110, the CPU 11 detects a second character string (or second character strings) from the input document data as a candidate (or candidates) for a second item to be associated with the first item(s).

In Step S111, the CPU 11 highlights the detected second character string(s). The user selects the second character string(s) and inputs an expected position of a third character string (or expected positions of third character strings) relative to the second character string(s) (key(s)). In this exemplary embodiment, the relative position(s) is/are input but the input of the relative position(s) may be omitted. If the relative position(s) is/are not input, the CPU 11 detects the third character string(s) omnidirectionally around the second character string(s) (key(s)).

In Step S112, the CPU 11 sets the selected second character string(s) as the second item(s).

In Step S113, the CPU 11 acquires the expected position(s) of the third character string(s) relative to the second character string(s) (key(s)).

In Step S114, the CPU 11 acquires the JSON format or the key-value format selected by the user.

In Step S115, the CPU 11 sets and stores the first item(s), the second item(s), the relative position(s), and the output format in setting information.

In Step S116, the CPU 11 determines whether to execute OCR. If OCR is executed (Step S116: YES), the CPU 11 proceeds to Step S117. If OCR is not executed (Step S116: NO), the CPU 11 terminates the information process.

In Step S117, the CPU 11 acquires the setting information.

In Step S118, the CPU 11 acquires the relative position(s) from the setting information.

In Step S119, the CPU 11 recognizes a third character string (or third character strings) written in a document based on the acquired relative position(s).

In Step S120, the CPU 11 determines whether the output format set in the setting information is the key-value format. If the output format is the key-value format (Step S120: YES), the CPU 11 proceeds to Step S121. If the output format is the JSON format (Step S120: NO), the CPU 11 proceeds to Step S122.

In Step S121, the CPU 11 acquires and links the first and second items set in the setting information.

In Step S122, the CPU 11 acquires the first and second items set in the setting information.

In Step S123, the CPU 11 outputs the first item(s), the second item(s), and the third character string(s) in the output format.

Second Exemplary Embodiment

In the first exemplary embodiment, the first item is the group key, and the second item is the key. In a second exemplary embodiment, the first item is the key, and the second item is the group key. In the second exemplary embodiment, the hardware configuration of the information processing apparatus 1 (see FIG. 1) and the functional configuration of the information processing apparatus 1 (see FIG. 2) are similar to those in the first exemplary embodiment and description thereof is omitted. In the second exemplary embodiment, the item-relation DB 40 (see FIG. 4) and the blank document in which identical group keys are set (see FIG. 5) are similar to those in the first exemplary embodiment and description thereof is omitted.

Figure 7:
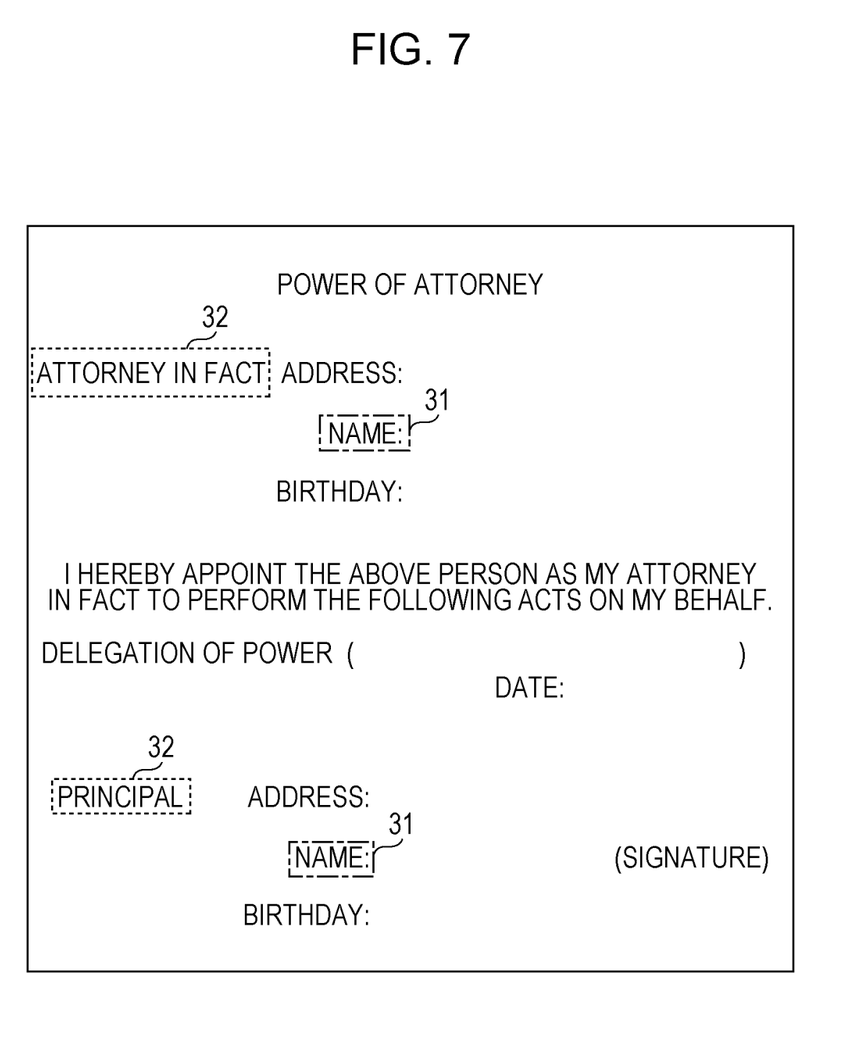
FIG. 7 illustrates an example of a blank document according to a second exemplary embodiment.

Referring to FIG. 7, description is made of a method for creating setting information by inputting keys according to the second exemplary embodiment. FIG. 7 illustrates an example of a blank document according to the second exemplary embodiment. In the blank document illustrated in FIG. 7, the same elements as those in FIG. 3 are represented by the same reference symbols as those in FIG. 3 and description thereof is omitted.

For example, a power of attorney is input to the information processing apparatus 1 as blank document data as illustrated in FIG. 7. The power of attorney contains items for "Address", "Name", and "Birthday" of "Attorney in fact". The power of attorney also contains items for "Address", "Name", and "Birthday" of "Principal".

Document data of the power of attorney and a key "Name" serving as a detection target are input to the information processing apparatus 1. As illustrated in FIG. 7, the information processing apparatus 1 detects first character strings 31 enclosed by chain lines as candidates for a first item, displays the first character strings 31 on the display 16, and sets the first character strings 31 as the first items. Specifically, the information processing apparatus 1 detects "Name" from the input document data and highlights "Name" on the display 16. If one first character string 31 is detected, the first character string 31 is set in the setting information as the first item. If a plurality of first character strings 31 are detected, the plurality of first character strings 31 are displayed on the display 16 and a first character string 31 selected by the user is set in the setting information as the first item. The user may select one or more first character strings.

In response to the setting of the first items, the information processing apparatus 1 detects second character strings 32 enclosed by dotted lines as candidates for second items to be associated with the first items, displays the second character strings 32 on the display 16, and sets the second character strings 32 as the second items. Specifically, the information processing apparatus 1 detects "Attorney in fact" and "Principal" around "Name" and highlights "Attorney in fact" and "Principal" on the display 16. If one second character string 32 is detected, the second character string 32 is set in the setting information as the second item. If a plurality of second character strings 32 are detected, the plurality of second character strings 32 are displayed on the display 16 and a second character string 32 selected by the user is set in the setting information as the second item. The user may select one or more second character strings.

In response to the setting of the second items, the information processing apparatus 1 prompts the user to select expected positions of third character strings relative to the positions of the first items (keys), and sets the selected relative positions in the setting information. The information processing apparatus 1 prompts the user to select an output format to be used when the third character strings are recognized, and sets the selected output format in the setting information.

When a written document is read, the information processing apparatus 1 acquires the setting information of the document identical to the read document, and recognizes, from the document, the third character strings associated with the first items and the second items contained in the setting information. The information processing apparatus 1 outputs the first items, the second items, and the third character strings in the output format set in the setting information.

Figure 8A:
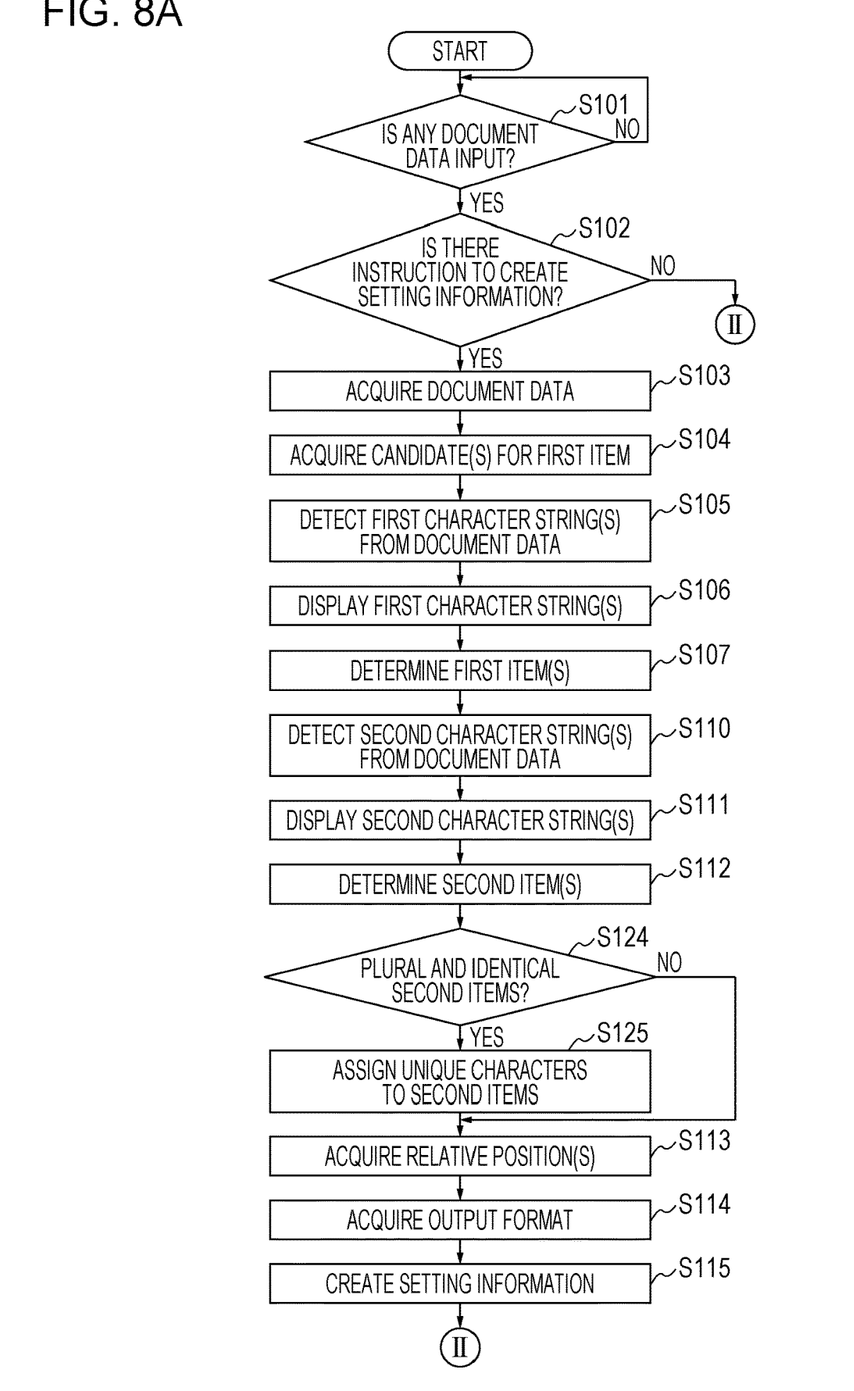
FIGS. 8A and 8B are flowcharts illustrating an example of an information process according to the second exemplary embodiment.
Figure 8B:
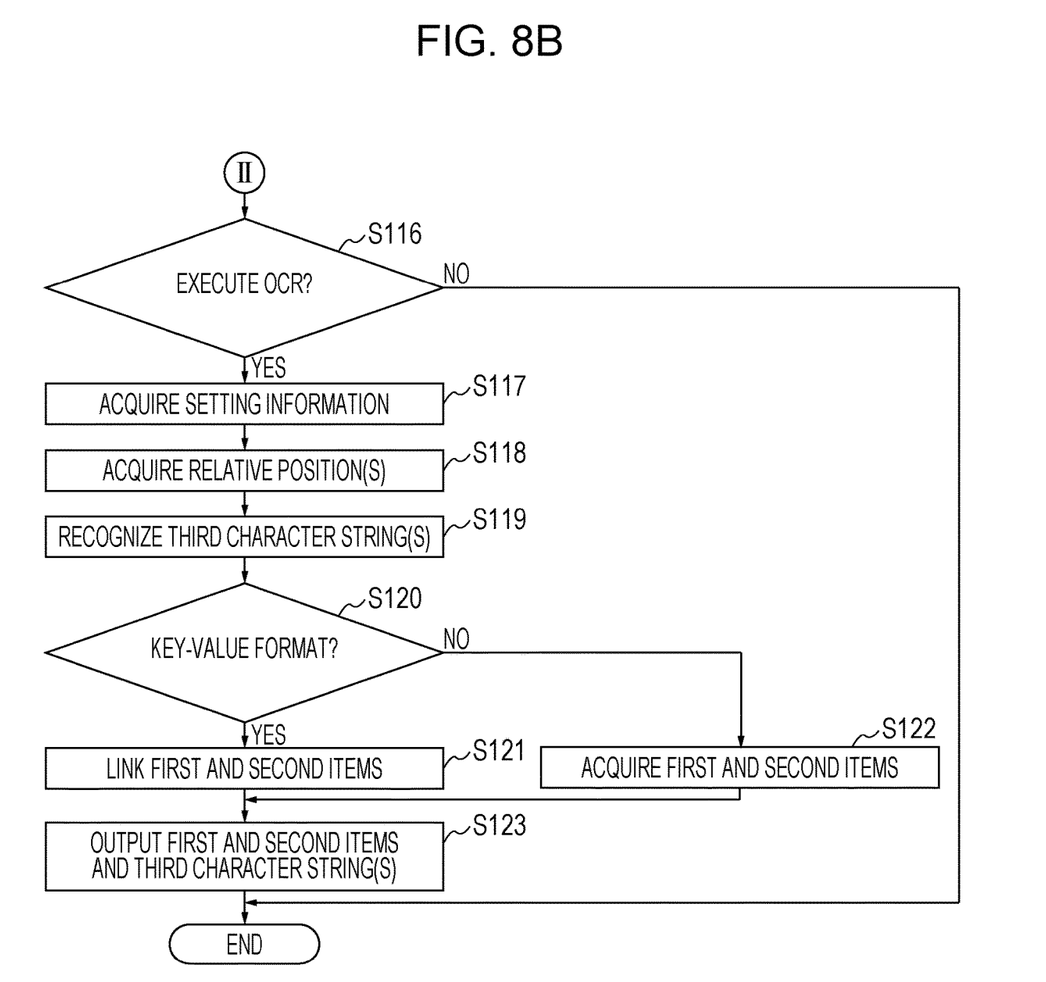

Next, operations of the information processing program according to this exemplary embodiment are described with reference to FIGS. 8A and 8B. FIGS. 8A and 8B are flowcharts illustrating an example of an information process according to the second exemplary embodiment. The CPU 11 executes the information process illustrated in FIGS. 8A and 8B by executing the information processing program read from the ROM 12 or the storage 14. For example, the information process illustrated in FIGS. 8A and 8B is executed when an instruction to execute the information processing program is input in response to activation of the information processing apparatus 1. In FIGS. 8A and 8B, the same steps as those in the information process illustrated in FIGS. 6A and 6B are represented by the same step numbers as those in FIGS. 6A and 6B and description thereof is omitted.

In Step S124, the CPU 11 determines whether a plurality of second items (group keys) are set and are identical to each other. If a plurality of second items (group keys) are set and are identical to each other (Step S124: YES), the CPU 11 proceeds to Step S125. If a plurality of second items (group keys) are not set or are not identical to each other (Step S124: NO), the CPU 11 proceeds to Step S113.

In Step S125, the CPU 11 assigns unique characters to the plurality of set second items and stores the second items.

The configurations of the information processing apparatus 1 according to the exemplary embodiments are examples and may be modified as appropriate.

The processing flows of the program according to the exemplary embodiments are examples and any unnecessary step may be removed, any new step may be added, or the order of processes may be changed.

In the embodiments above, the term "processor" refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the exemplary embodiments, the information processing program is prestored (preinstalled) in the storage 14 but is not limited thereto. The program may be provided by being recorded in a recording medium such as a compact disc read only memory (CD-ROM), a digital versatile disc read only memory (DVD-ROM), or a universal serial bus (USB) memory. Alternatively, the program may be downloaded from an external apparatus via a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to
   detect, in response to detection of a plurality of first character strings each representing a first item from a document having writing fields for items, second character strings related to the plurality of first character strings, respectively, and
   set at least one of the detected second character strings in setting information as a second item associated with the first item.

2. The information processing apparatus according to claim 1, wherein the processor is configured to execute at least one of (i) a process of displaying the plurality of detected first character strings as candidates for the first item or (ii) a process of displaying the plurality of second character strings as candidates for the second item.

3. The information processing apparatus according to claim 2, wherein the processor is configured to execute at least one of (i) a process of prompting a user to select at least one of the plurality of detected first character strings as the first item or (ii) a process of prompting the user to select at least one of the plurality of second character strings as the second item.

4. The information processing apparatus according to claim 3, wherein the processor is configured to associate the first item with the second item based on (i) positional information of the first item and the second item in the document or (ii) a hierarchical relationship of word definitions of the first item and the second item.

5. The information processing apparatus according to claim 4, wherein the processor is configured to
   detect a third character string written in a writing field specified by the setting information, and
   output the third character string in association with the setting information.

6. The information processing apparatus according to claim 3, wherein the processor is configured to
   detect a third character string written in a writing field specified by the setting information, and
   output the third character string in association with the setting information.

7. The information processing apparatus according to claim 6, wherein the processor is configured to output the first item contained in the setting information, the second item contained in the setting information, and the third character string in (i) a first format in which the first item, the second item, and the third character string are output separately or (ii) a second format in which the first item and the second item are linked into a unified item and the unified item and the third character string are output.

8. The information processing apparatus according to claim 2, wherein the processor is configured to associate the first item with the second item based on (i) positional information of the first item and the second item in the document or (ii) a hierarchical relationship of word definitions of the first item and the second item.

9. The information processing apparatus according to claim 8, wherein the processor is configured to
   detect a third character string written in a writing field specified by the setting information, and
   output the third character string in association with the setting information.

10. The information processing apparatus according to claim 9, wherein the processor is configured to output the first item contained in the setting information, the second item contained in the setting information, and the third character string in (i) a first format in which the first item, the second item, and the third character string are output separately or (ii) a second format in which the first item and the second item are linked into a unified item and the unified item and the third character string are output.

11. The information processing apparatus according to claim 2, wherein the processor is configured to
    detect a third character string written in a writing field specified by the setting information, and
    output the third character string in association with the setting information.

12. The information processing apparatus according to claim 11, wherein the processor is configured to output the first item contained in the setting information, the second item contained in the setting information, and the third character string in (i) a first format in which the first item, the second item, and the third character string are output separately or (ii) a second format in which the first item and the second item are linked into a unified item and the unified item and the third character string are output.

13. The information processing apparatus according to claim 1, wherein the processor is configured to associate the first item with the second item based on (i) positional information of the first item and the second item in the document or (ii) a hierarchical relationship of word definitions of the first item and the second item.

14. The information processing apparatus according to claim 13, wherein the processor is configured to
    detect a third character string written in a writing field specified by the setting information, and
    output the third character string in association with the setting information.

15. The information processing apparatus according to claim 14, wherein the processor is configured to output the first item contained in the setting information, the second item contained in the setting information, and the third character string in (i) a first format in which the first item, the second item, and the third character string are output separately or (ii) a second format in which the first item and the second item are linked into a unified item and the unified item and the third character string are output.

16. The information processing apparatus according to claim 1, wherein the processor is configured to
   detect a third character string written in a writing field specified by the setting information, and
   output the third character string in association with the setting information.

17. The information processing apparatus according to claim 16, wherein the processor is configured to output the first item contained in the setting information, the second item contained in the setting information, and the third character string in (i) a first format in which the first item, the second item, and the third character string are output separately or (ii) a second format in which the first item and the second item are linked into a unified item and the unified item and the third character string are output.

18. The information processing apparatus according to claim 17, wherein the processor is configured to receive an operation of selecting the first format or the second format.

19. The information processing apparatus according to claim 17, wherein the processor is configured to assign, when setting a plurality of identical first items or a plurality of identical second items in the setting information, unique characters to the first items or the second items, respectively.

20. A non-transitory computer readable medium storing an information processing program causing a computer to execute a process comprising:
   detecting, in response to detection of a plurality of first character strings each representing a first item from a document having writing fields for items, second character strings related to the plurality of first character strings, respectively; and
   setting at least one of the detected second character strings in setting information as a second item associated with the first item.

* * * * *